US012808185B2

(12) United States Patent
Lu et al.

(10) Patent No.: US 12,808,185 B2
(45) Date of Patent: Nov. 24, 2026

(54) DISPLACEMENT AMPLIFICATION SELF-CENTERING FRICTION DAMPER

(71) Applicant: TONGJI UNIVERSITY, Shanghai (CN)

(72) Inventors: Zheng Lu, Shanghai (CN); Sheng Li, Shanghai (CN); Zhijie Wang, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 269 days.

(21) Appl. No.: 18/727,343

(22) PCT Filed: Feb. 27, 2024

(86) PCT No.: PCT/CN2024/078763

§ 371 (c)(1),
(2) Date: Jul. 9, 2024

(87) PCT Pub. No.: WO2025/086518

PCT Pub. Date: May 1, 2025

(65) Prior Publication Data

US 2026/0146445 A1 May 28, 2026

(30) Foreign Application Priority Data

Oct. 26, 2023 (CN) ......................... 202311397807.9

(51) Int. Cl.

| | |
|---|---|
| ***E04B 1/98*** | (2006.01) |
| ***E04H 9/02*** | (2006.01) |
| ***F16F 7/04*** | (2006.01) |

(52) U.S. Cl.

CPC .............. *E04B 1/98* (2013.01); *E04H 9/0215* (2020.05); *F16F 7/04* (2013.01); *F16F 2222/04* (2013.01); *F16F 2232/06* (2013.01)

(58) Field of Classification Search

CPC ............... F16F 7/02–04; F16F 7/08–09; F16F 2222/04; F16F 2232/06; E04B 1/98; E04H 9/0215; E04H 9/023; E04H 9/0237

See application file for complete search history.

(56) References Cited

FOREIGN PATENT DOCUMENTS

| | | | |
|---|---|---|---|
| CN | 112081851 A * | 12/2020 | ............ F16F 7/1022 |
| CN | 112081852 A * | 12/2020 | ................ F16F 7/06 |

(Continued)

OTHER PUBLICATIONS

"International Search Report (Form PCT/ISA/210) of PCT/CN2024/078763", mailed on Apr. 13, 2024, pp. 1-3.

(Continued)

*Primary Examiner* — James J Taylor, II

(74) *Attorney, Agent, or Firm* — JCIPRNET

(57) ABSTRACT

This invention relates to a kind of displacement amplification self-centering friction damper. The device uses gears to convert the axial deformation into the rotation of the friction-disc, and the friction device engages in friction at the edge of the friction-disc, then the displacement can be amplified and therefore it can reduce the frictional force and prolong the service life of friction components. At the same time, through gear transmission, the friction force provided by the friction device can increase with the increase of relative displacement, then it can provide suitable energy dissipation capability under different working conditions. Additionally, the device can automatically return to its initial state by disc-spring, and also provides self-centering capability for the structure simultaneously, advantageous in reducing residual deformation of the structure under severe earthquake. Compared with existing technologies, this invention has a better energy dissipation effect and is suitable for vibration control in engineering structures.

10 Claims, 4 Drawing Sheets

(56) References Cited

FOREIGN PATENT DOCUMENTS

| | | | | |
|---|---|---|---|---|
| CN | 112663812 | | 4/2021 | |
| CN | 111764529 B | * | 7/2021 | ............... E04B 1/98 |
| CN | 114562052 | | 5/2022 | |
| CN | 115538835 | | 12/2022 | |
| CN | 117344882 | | 1/2024 | |

OTHER PUBLICATIONS

"Written Opinion of the International Searching Authority (Form PCT/ISA/237) of PCT/CN2024/078763", mailed on Apr. 13, 2024, pp. 1-4.

* cited by examiner

DISPLACEMENT AMPLIFICATION SELF-CENTERING FRICTION DAMPER

CROSS-REFERENCE TO RELATED APPLICATION

This application is a 371 of international application of PCT application serial no. PCT/CN2024/078763, filed on Feb. 27, 2024, which claims the priority benefit of China application no. 202311397807.9, filed on Oct. 26, 2023. The entirety of each of the above mentioned patent applications is hereby incorporated by reference herein and made a part of this specification.

TECHNICAL FIELD

This invention pertains to the field of vibration control technology in civil engineering structures, particularly focusing on a displacement amplification self-centering friction damper.

BACKGROUND

Earthquake is an extremely destructive and unpredictable natural disasters, making seismic design an important aspect of structural engineering. Traditional design methods rely on the inherent ductility of structures to achieve the goal of "not falling under strong earthquakes". However, this approach often leads to severe damage and large deformation after strong earthquakes, resulting a high repair cost, and even the whole structure has to be demolition. As the demand on structural lifespans increases, the probability of encountering earthquakes during a structure's service life also increases, highlighting the growing importance of addressing these issues.

In order to overcome these problems, a solution is to arrange dampers in structures to dissipate seismic energy, thus reducing structural damage. Common-used dampers in engineering include tuned mass dampers (TMD), viscous dampers, metal dampers, and friction dampers. However, existing technologies often face the following problems:

1. Complexity. For instance, the performance of TMD is significantly influenced by the dynamic characteristics of the structure, and metal dampers rely on the plastic deformation of metals to dissipate energy, making the mechanisms more complex.
2. Variability of mechanical performance. For example, the properties of the materials in viscous dampers fluctuating under the change of environmental condition such as temperature.
3. High maintenance expense. Metal dampers will undergo plastic deformation after dissipating energy, then there is often a requirement to evaluation and replacement. Furthermore, this kind of dampers in engineering structures is often difficult to replace.

In comparison, friction dampers are simpler and more reliable. However, the frictional forces within these dampers are often large to acquire sufficient energy dissipation since the deformation of building structures are often very small, resulting in significant material wear and frequent replacements.

Therefore, there is an urgent need to design friction dampers that can effectively dissipate energy while prolonging the lifespan of friction components.

DETAILED DISCRIPTION

The purpose of this invention is to overcome the shortcomings of the existing technology by providing a displacement amplification self-centering friction damper. The device uses gears to convert the axial deformation of the damper into the rotation of the friction-disc, and the friction device engages in friction at the edge of the friction-disc, then the displacement can be amplified and therefore it can reduce the need of the frictional force. At the same time, through gear transmission, the friction force provided by the friction device can increase with the increase of relative displacement, then it can reduce the wear of friction pads under normal condition, and the disc-springs can provide a self-centering capability to the structure, which aids in reducing residual deformation of the structure under strong earthquake.

The invention is implemented by the following technical scheme:

The invention provides a displacement amplification self-centering friction damper, which comprises a sleeve, a bushing, a transmission device, a friction device, and a self-centering device;

The sleeve comprises an outer sleeve and an inner sleeve, wherein the outer sleeve and the inner sleeve form a plug-in nested structure;

One end of the bushing is fixed to the outer sleeve in ordered to accommodate a first disc-spring, while the other end of the bushing is threaded;

One end of the outer sleeve and one end of the inner sleeve have a pull ring for connection to external structures respectively;

The bottom of the inner sleeve is equipped with two racks, which engage with the transmission device;

The transmission device comprises friction-disc gears, winch gears, a friction-disc, a winch, steel strand, a wire bushing, and a first end cap, where the winch gears, the friction-disc gears, and the winch are inside the outer sleeve, the winch gears are coaxially fixed to the winch, and the friction-disc gears are coaxially fixed to the friction-disc;

One end of the first end cap is connected to the bushing via threads, while the other end of the first end cap is connected to the wire bushing;

One end of the steel strand is connected to the winch, while the other end of the steel strand passes through the first hole on the outer sleeve, then through the bushing and entering the first end cap and the wire bushing, and the other end of the steel strand passing through the wire bushing is connected to the friction device at this end;

The friction device is fixed to the outside of the outer sleeve and next to the edge of the friction-disc, the friction device comprises clamp arms, friction-pads, connecting rods, and second disc-springs, and the friction-pads and the second disc-springs are both fixed on the clamp arms, the clamp arms are connected to the connecting rods;

The self-centering device comprises a first disc-spring, a first disc, and a first anchor, where the steel strand passes through the center of the first disc-spring and the first disc, and after applying a certain pressure to the first disc against the first disc-spring, the first disc is fixed on the steel strand via the first anchor;

When the inner sleeve and outer sleeve are subjected to a relative motion in any directions, the transmission device causes the friction-disc to rotate under the drive of the racks, and the relative displacement between the steel strand and the wire bushing drives the friction device to press the friction pads against the edge of the friction-disc, then frictional energy dissipation can be achieved, and the transmission ratio between the friction-disc and the friction-disc gears ensures that the relative displacement between the friction pads and the friction-disc is greater than the relative displacement between the inner sleeve and outer sleeve, thus the displacement can be amplified;

After the external force is removed, due to the first disc-spring of the self-centering device, the entire device can automatically return to its initial state, providing self-centering capability.

In addition, there are two clamp arms positioned on two sides of the friction-disc respectively, the central parts of the two clamp arms have a second hole for the steel strand to pass through, while the two clamp arms are connected to a third bolt via the two parallel connecting rods respectively.

In addition, the second disc-springs comprise two identical disc-springs positioned on one side of the clamp arms and the center between the two clamp arms;

One end of the wire bushing, near the friction device, is connected to the second end cap and the steel wire strand inside the wire bushing passes through the second end cap, then successively through one of the second disc springs, one side of the clamp arms, the other second disc spring, the other side of the clamp arms, the second disc, the second anchor, and finally secured to the second disc.

In addition, the connecting rods comprise an upper connecting rod and a lower connecting rod, while one end of the connecting rod is connected to the clamp arm via a rivet, and the other end is connected to the third bolt;

The upper connecting rod and the lower connecting rod are respectively fixed to the outer sleeve via the third bolt;

The third bolt successively passes through the upper connecting rod, the steel bushing, the lower connecting rod, and finally fixed to the outside of the outer sleeve by a third nut.

In addition, on both sides of the outer sleeve, there are third holes at the positions corresponding to the winch gears for passing through the first bolt;

The winch gears are two in total connected in series, with a winch positioned between the two winch gears, and the outer sleeve, winch gears, and winch are fixed by a first bolt component;

The first bolt component comprises a first bolt and a first nut.

In addition, the upper surface of the outer sleeve and the lower surface of the outer sleeve are both equipped with rectangular holes for the passage of the friction-discs, and fourth holes are located on the outer sleeve corresponding to the friction-disc gears for the passage of the second bolt;

The friction-disc gears are two in total, a friction-disc is between the friction-disc gears, and gaskets are set on both sides of the friction-disc;

The outer sleeve, the friction-disc gears, the friction-disc, and the gaskets are fixed by a second bolt component;

The second bolt component comprises a second bolt and a second nut.

In addition, the rack and the friction-disc gears are directly meshed, or meshed by multi-stage gears to enhance displacement amplification and reduce the diameter of the friction-disc.

In addition, the inner side of the first bolt component and the second bolt component has disk-shaped protrusions, which can apply pressure to the parts and prevent the relative sliding when the components rotate, and the entire components can freely rotate around the longitudinal axis of the first bolt component and the second bolt component at the same time.

In addition, the height of the steel bushing is equal to the distance between the upper connecting rod and the lower connecting rod;

The connecting rods are provided with bends next to the third bolt in order to stagger the connections between the connecting rods and the third bolt.

In addition, the friction pads are fixed on the inner side of the clamp arms and next to the edge of the friction-disc and the material of the friction pads is carbon fiber.

Compared with existing technical proposal, the present invention has the following advantages and beneficial effects:

1. Good energy dissipation performance. By amplifying displacement, this invention allows frictional forces to work over a longer distance, resulting in a better energy dissipation effect. This makes it suitable for vibration control in engineering structures.
2. High reliability. This invention dissipates energy through friction and provide self-centering capability via disc-springs, employing a simple and reliable principle. Moreover, the performance of this invention is insensitive to the environment and without the need of external factors, hence ensuring strong reliability.
3. Material saving. The friction device in this invention can provide appropriate energy dissipation capacity under different working conditions, thereby reducing wear and tear on friction pads under normal usage conditions.
4. Easy to maintain. The friction pads and friction-discs in this invention can be directly replaced without disassembling the entire device, making maintenance more convenient.

DISCRIPTION OF THE PREFERRED EMBODIMENT

The following provides a detailed explanation of the specific implementation methods of the invention through examples, which are based on the scheme described in this invention. Detailed implementation methods and specific operation processes are provided, but the scope of protection of the present invention is not limited to the following embodiments.

The invention will be further elaborated by combining the accompanying drawings and specific embodiments. Features such as component models, material names, and connection structures that are not clearly stated in this technical solution are considered common technical features disclosed in existing technology.

Embodiment 1

Figure 1:
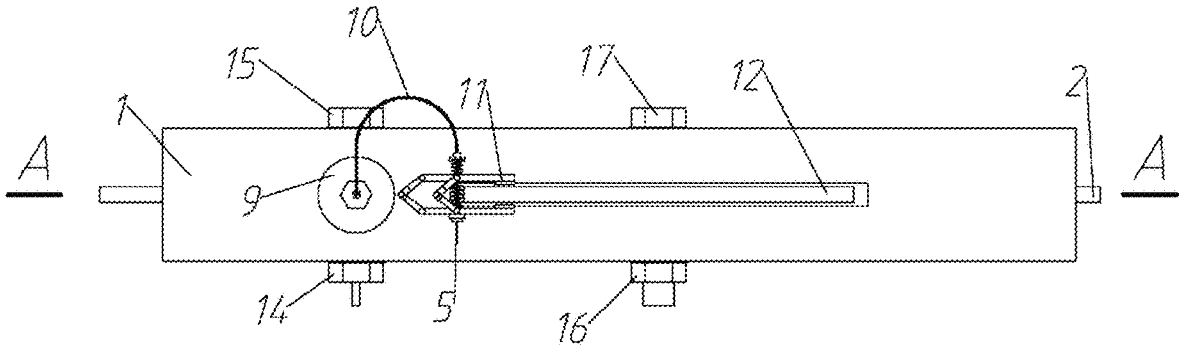
FIG. 1 is the top view of the displacement amplification self-centering friction damper.
Figure 2:
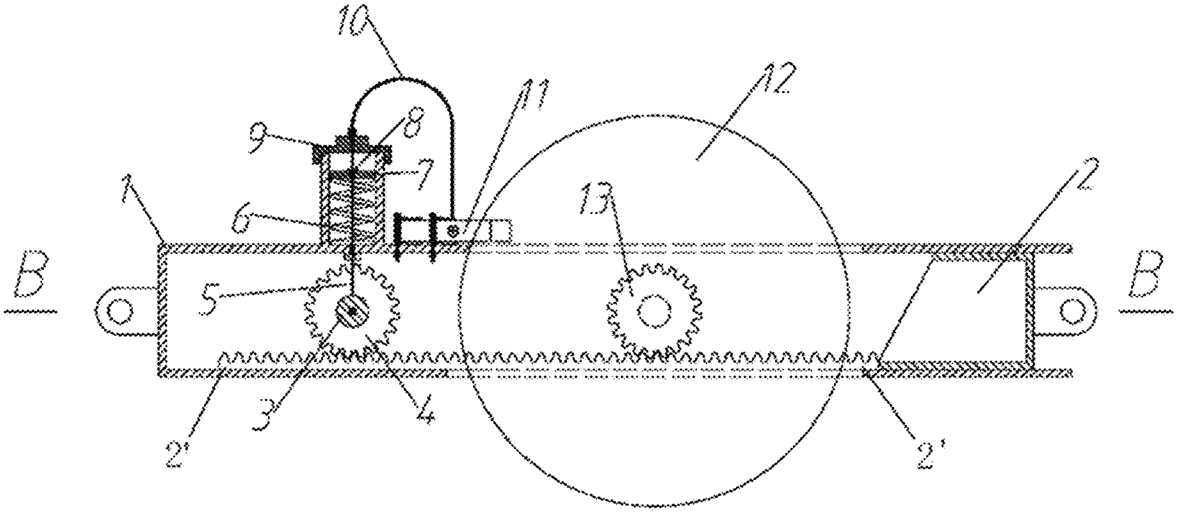
FIG. 2 is the A-A cross-sectional view of the displacement amplification self-centering friction damper.

This embodiment provides a displacement amplification self-centering friction damper, as depicted in FIG. 1 and FIG. 2, which comprises a sleeve, a bushing, a transmission device, a friction device 11, and a self-centering device.

Figure 10:
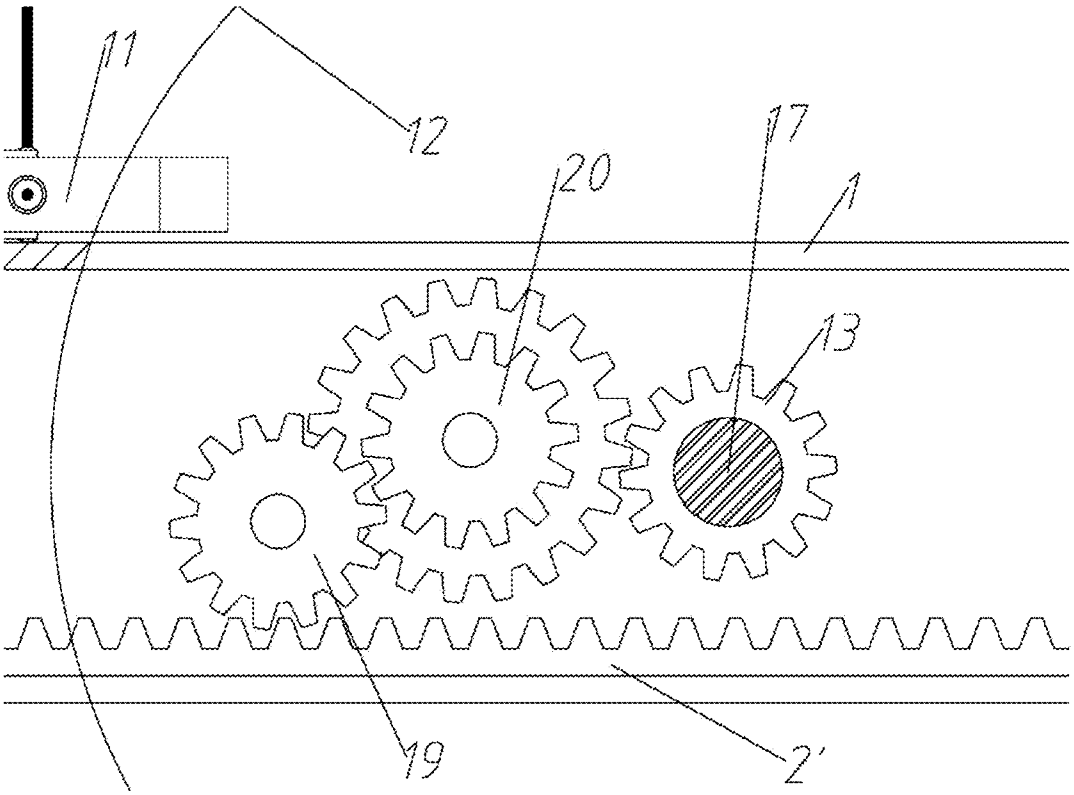
FIG. 10 is the schematic diagram of the structure at the friction-disc gear of the displacement amplification self-centering friction damper using multi-stage gears in embodiment 1.

The sleeve comprises an outer sleeve 1 and an inner sleeve 2, wherein the outer sleeve 1 and the inner sleeve 2 form a plug-in nested structure. One end of the outer sleeve 1 and one end of the inner sleeve 2 have a pull ring for connection to external structures respectively, which reduces the adverse effects of bending moments applied to the device. The outer sleeve 1 has a cuboid shape, with rectangular holes on the upper surface and the lower surface for the passage of the friction-disc 12. The inner sleeve 2 has a cuboid shape and can be nested into the outer sleeve 1, which has two racks 2' at the bottom and there is a spacing between the racks 2' for the passage of the friction-disc 12. On both sides of the outer sleeve 1, there are third holes at the positions corresponding to the winch gears 4 for passing through the first bolt 15. The racks 2' and the friction-disc gears 13 can be meshed by multi-stage gears to enhance displacement amplification and reduce the diameter of the friction-disc 12, however, this will also increase the complexity of the device, as shown in FIG. 10, which use first-level gear 19 and second-level gear 20.

Figure 8:
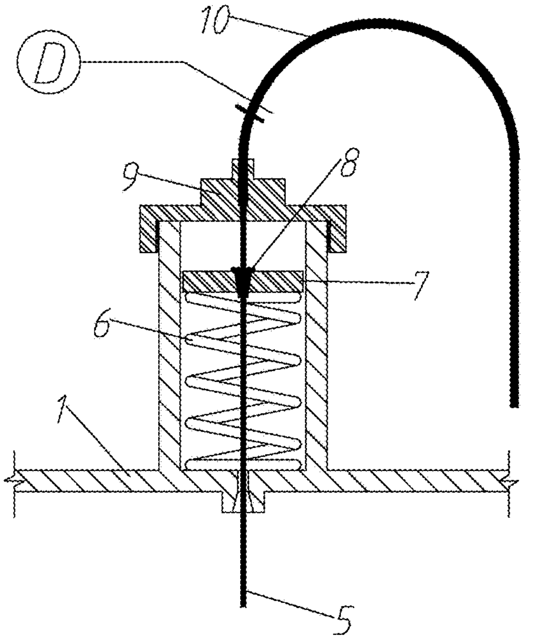
FIG. 8 is the zoomed-in view of the bushing on the outer sleeve in embodiment 1.
Figure 9:
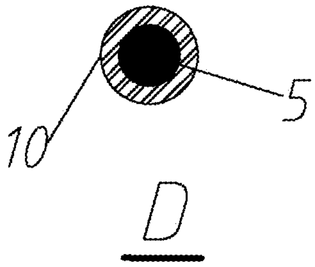
FIG. 9 is the sectional view of the wire bushing at position D in embodiment 1.

As shown in FIG. 2, the sleeve is located outside the outer sleeve 1 and above the winch 3, which can accommodate the first disc-spring 6. The top of the sleeve is threaded, and a fifth hole is located in the center of the bottom for the passage of the steel strand 5. The bottom of the fifth hole is chamfered to reduce the wear of the steel strand 5. As shown in FIG. 8, begin from winch 3, the steel strand 5 successively passes through the first hole on outer sleeve 1, the first disc-spring 6 inside the sleeve, the first disc 7, then fixed to the first disc 7 by the first anchor 8, with a preload applied to the first disc-spring 6. Then it passes through the first end cap 9 and the fixed wire bushing 10 fixed on the first end cap 9. The first end cap 9 is fixed to the bushing on the outer sleeve 1 through threads, and it has a hexagonal protrusion for tightening the end cap. Steel strand 5 passes through the wire bushing 10 and can slide relative to each other, as shown in FIG. 9. The other end of the steel strand 5 and the wire bushing 10 are finally connected to the friction device 11.

Figure 3:
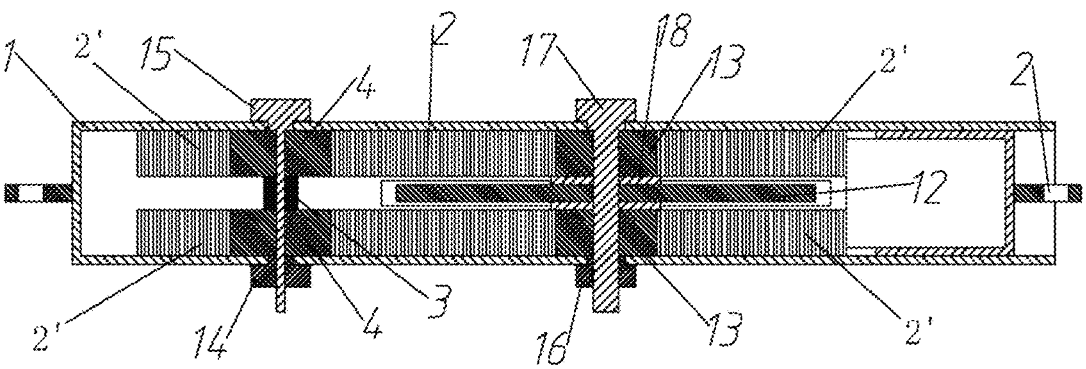
FIG. 3 is the B-B cross-sectional view of the displacement amplification self-centering friction damper.

FIG. 3 is the B-B cross-sectional view of the displacement amplification self-centering friction damper. As show in the figure, the transmission device comprises friction-disc gears 13, winch gears 4, a friction-disc 12, a winch 3, steel strand 5, a wire bushing 10, and a first end cap 9, where the winch gears 4, the friction-disc gears 13, and the winch 3 are inside the outer sleeve 1, the winch gears 4 are coaxially fixed to the winch 3, and the friction-disc gears 13 are coaxially fixed to the friction-disc 12 respectively.

One end of the first end cap 9 is connected to the bushing via threads, while the other end of the first end cap 9 is connected to the wire bushing 10. One end of the steel strand 5 is connected to the winch 3, while the other end of the steel strand 5 passes through the first hole on the outer sleeve 1, then through the bushing and entering the first end cap 9 and the wire bushing 10, and the other end of the steel strand 5 passing through the wire bushing 10 is connected to the friction device 11 at this end.

The winch gears 4 are two in total connected in series, with a winch 3 positioned between the two winch gears 4. The first bolt 15 passes through the outer sleeve 1, winch gears 4, winch 3, and is tightened with the first nut 14. There are two friction-disc gears 13, and a friction-disc 12 is located between the two friction-disc gears 13, and gaskets 18 are install on two sides of the friction-disc 12. The second bolt 17 passes through the outer sleeve 1, the friction-disc gears 13, the friction-disc 12, and the gaskets 18 successively, and finally fixed with the second nut 16. There are circular protrusions at the inner sides of the second bolt 17, the second nut, the first bolt 15, and the first nut, whose height is slightly greater than the wall thickness of the outer sleeve 1. The protrusions can apply pressure to the internal parts, which can ensure that the parts rotate around the bolt axis without relative sliding. The friction-disc gears 13 and the winch gears 4 mesh with the racks 2' at the inner sleeve 2. Steel strand 5 is fixed on winch 3. In the initial state, steel strand 5 passes through the center of the winch 3, then tighten the first bolt 15 after installation. When the winch 3 rotates in any directions, it will wrap steel strand 5 on the winch 3, then the steel strand 5 is pulled.

Figure 4:
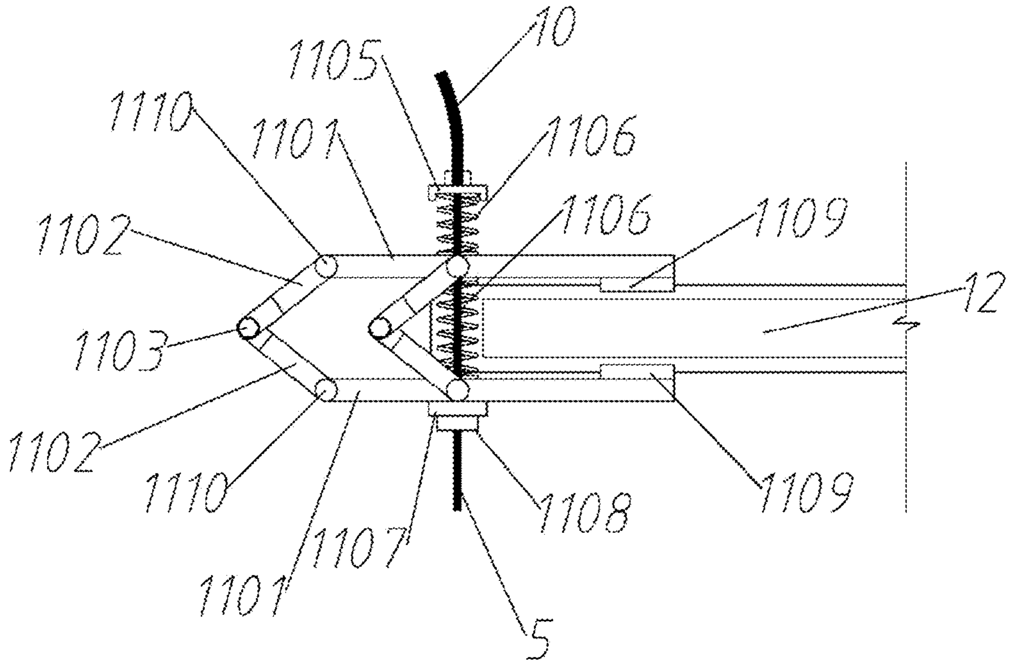
FIG. 4 is the top view of the friction device in embodiment 1.
Figure 6:
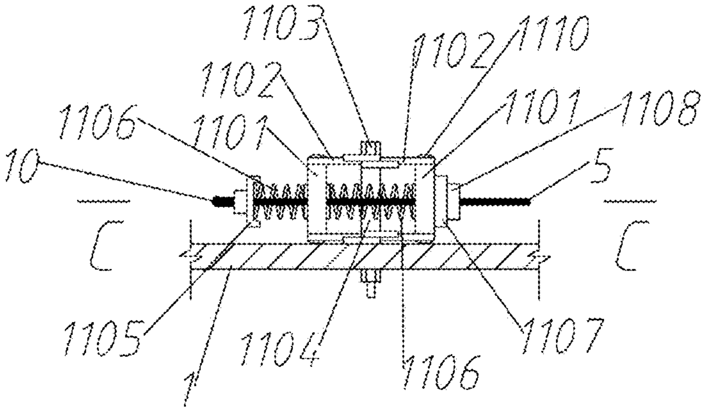
FIG. 6 is the side elevation view of the friction device in embodiment 1.

FIG. 4 and FIG. 6 are the top view and side elevation view of the friction device. As shown in the FIG. 4 and FIG. 6, the friction device 11 is fixed to the outside of the outer sleeve 1 and next to the edge of the friction-disc 12. The friction device 11 comprises clamp arms 1101, friction-pads 1109, connecting rods 1102, and a second disc-springs 1106, and the friction-pads 1109 and the second disc-springs 1106 are both fixed on the clamp arms 1101. There are two clamp arms 1101 positioned on two sides of the friction-disc 12 respectively, the central parts of the two clamp arms 1101 have a second hole for the steel strand 5 to pass through, while the clamp arms 1101 are connected to a third bolt 1103 via the two parallel connecting rods 1102 respectively.

Figure 5:
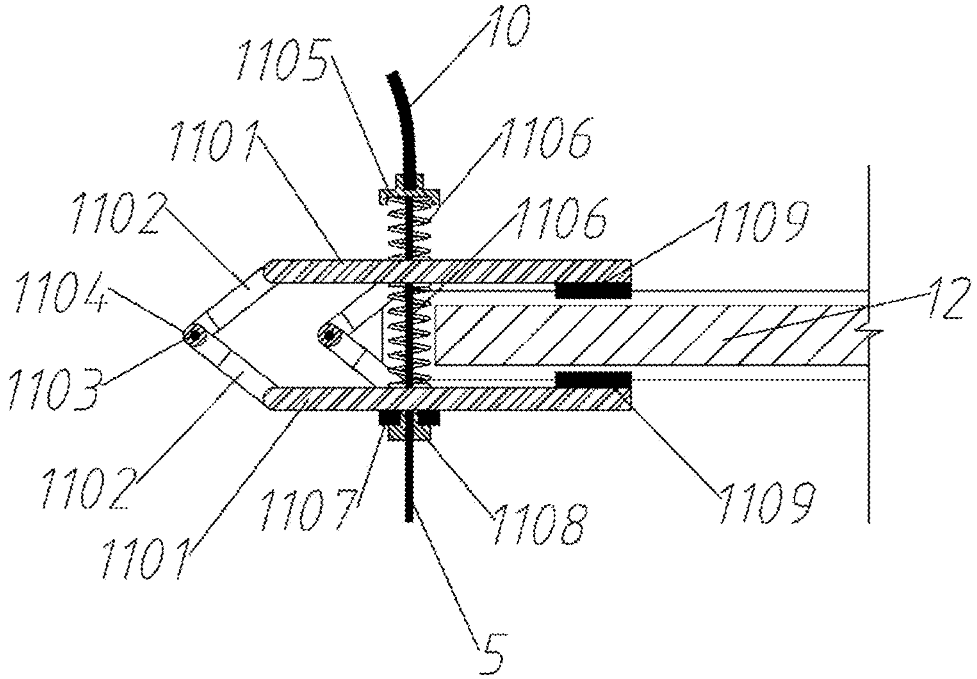
FIG. 5 is the C-C cross-sectional view of the friction device in embodiment 1.
Figure 7:
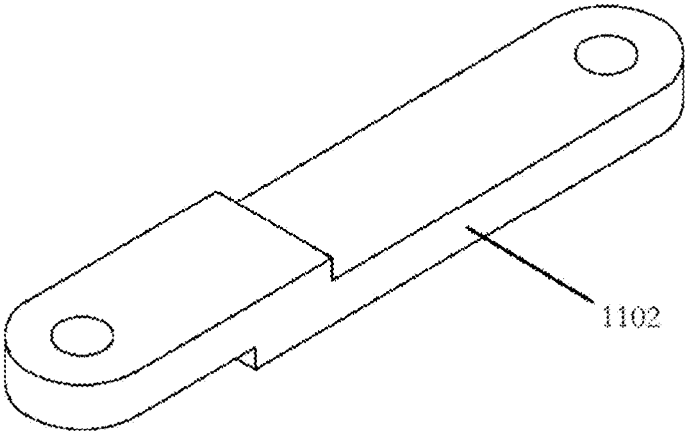
FIG. 7 is the three-dimensional view of the connecting rods in embodiment 1.

As shown in FIG. 5, the connecting rods 1102 comprise an upper connecting rod and a lower connecting rod, while one end of the connecting rods 1102 is connected to the clamp arm 1101 via a rivet 1110, and the other end of the connecting rods 1102 is connected to the third bolt 1103. The upper connecting rod and the lower connecting rod are respectively fixed to the outer sleeve 1 via the third bolt 1103. The third bolt 1103 successively passes through the upper connecting rod, the steel bushing 1104, the lower connecting rod, and finally fixed to the outside of the outer sleeve 1 by a third nut. The height of the steel bushing 1104 is equal to the distance between the upper connecting rod and the lower connecting rod. The connecting rods 1102 are provided with bends next to the third bolt 1103, as shown in the FIG. 7, in order to stagger the connections between the connecting rods 1102 and the third bolt 1103. The friction pads 1109 are fixed on the inner side of the clamp arms 1101 and next to the edge of the friction-disc 12 and the material of the friction pads 1109 is carbon fiber.

The second disc-springs 1106 comprise two identical disc-springs positioned on one side of the clamp arms 1101 and the center between the two clamp arms 1101. One end of the wire bushing 10, near the friction device 11, is connected to the second end cap 1105 and the steel wire strand 5 inside the wire bushing 10 passes through the second end cap 1105, then successively through one of the second disc springs 1106, one side of the clamp arms 1101, the other one of the second disc springs 1106, the other side of the clamp arms 1101, the second disc 1107, the second anchor 1108, and finally secured to the second disc 1107. By pulling the steel strand 5, the inward relative motion between the second end cap 1105 and the second disc 1107 occurs, thereby applying a preload to the two disc-springs 1106.

When the inner sleeve 2 and the outer sleeve 1 are applied to a relative motion in any direction, the friction-disc gears 13 and the winch gears 4 will rotate by the driving of the racks 2' on the inner sleeve 2. The friction-disc gears 13 drive the friction-disc 12 to rotate, and the winch gears 4 drive the winch 3 to pull the steel strand 5. The steel strand 5 drives the first disc 7 to compress the first disc-spring 6. At the same time, the relative motion between the steel strand 5 and the wire bushing 10 will compress the two second disc-springs 1106 on the friction device 11, then compress the friction pads 1109 onto the edge of the friction disc 12 through the clamp arm 1101, then frictional energy dissipation can be acquired by applying a certain amount of pressure.

Since the diameter of the friction-disc 12 is larger than the diameter of the friction-disc gear 13, the relative displacement between the friction pads 1109 and the friction-disc 12 is greater than the relative displacement between the inner sleeve 2 and the outer sleeve 1 through the transmission device, and thus the displacement amplification is acquired. Since the frictional force has a longer displacement to work, the device has a better energy dissipation performance, and the need for frictional force can be reduced, which can reduce the wear of friction pads. In addition, as the relative displacement between the inner sleeve 2 and the outer sleeve 1 increases, the preload of the second disc-spring 1106 also increases, and the pressure applied by the clamp arm 1101 on the friction pads 1109 also increases. Consequently, the friction force and energy dissipation capacity of the friction device also increase. This can provide appropriate energy dissipation capacity under different working conditions, greatly reducing excessive wear of the friction material under normal using. After the external force is removed, due to the first disc-spring 6, the entire device can automatically return to its initial state, and the structure also provide a self-centering capability for the device after strong earthquakes.

Since the friction pads 1109 is easy to replace, the cost can be reduced, and the friction is sufficient. The friction-pads 1109 are made of materials with better friction performance, such as carbon fiber, while the friction plate 12 is made of more wear-resistant materials, such as alloy steel, therefore the replacement can be reduced and the materials can be fully utilized. If the friction-disc 12 is needed to be replaced, it can be replaced by simply loosening the second bolt 17 and the second nut 18, and there is no need to disassemble the entire device for replacement.

The above description of embodiments is for the convenience of technician in the art to understand and use the invention. Those familiar with the technology in this field can easily make various modifications to these embodiments and apply the general principles explained here to other embodiments without the need for creative labor. Therefore, the invention is not limited to the aforementioned embodiments, and any improvements and modifications made by those skilled in the art based on the disclosure of the invention that do not fall outside the scope of the invention should be within the scope of protection of the invention.

What is claimed is:

1. A displacement amplification self-centering friction damper, comprising a sleeve, a bushing, a transmission device, a friction device, and a self-centering device;

the sleeve comprises an outer sleeve and an inner sleeve, wherein the outer sleeve and the inner sleeve form a plug-in nested structure;

one end of the bushing is fixed to the outer sleeve in ordered to accommodate a first disc-spring, while the other end of the bushing is threaded;

each of one end of the outer sleeve and one end of the inner sleeve has a pull ring for connection to external structures respectively;

a bottom of the inner sleeve is equipped with two racks, which engage with the transmission device;

the transmission device comprises friction-disc gears, winch gears, a friction-disc, a winch, a steel strand, a wire bushing, and a first end cap, where the winch gears, the friction-disc gears, and the winch are inside the outer sleeve, the winch gears are coaxially fixed to the winch, and the friction-disc gears are coaxially fixed to the friction-disc;

one end of the first end cap is connected to the bushing via threads, while the other end of the first end cap is connected to the wire bushing;

one end of the steel strand is connected to the winch, then passes through a first hole on the outer sleeve, then through the bushing and entering the first end cap and the wire bushing, and the other end of the steel strand passing through the wire bushing is connected to the friction device;

the friction device is fixed to an outside of the outer sleeve and next to an edge of the friction-disc, the friction device comprises clamp arms, friction-pads, connecting rods, and second disc-springs, and the friction-pads and the second disc-springs are both fixed on the clamp arms, the clamp arms are connected to the connecting rods;

the self-centering device comprises the first disc-spring, a first disc, and a first anchor, where the steel strand passes through a center of the first disc-spring and the first disc, and after applying a certain pressure to the first disc against the first disc-spring, the first disc is fixed on the steel strand via the first anchor;

when the inner sleeve and outer sleeve are subjected to relative motion, the transmission device causes the friction-disc to rotate under the drive of the racks, and a relative displacement between the steel strand and the wire bushing drives the friction device to press the friction pads against the edge of the friction-disc, then frictional energy dissipation can be achieved, and a transmission ratio between the friction-disc and the friction-disc gears ensures that a relative displacement between the friction pads and the friction-disc is greater than a relative displacement between the inner sleeve and outer sleeve, thus the displacement can be amplified;

after the external force is removed, due to the first disc-spring of the self-centering device, the displacement amplification self-centering friction damper can automatically return to an initial state, providing self-centering capability.

2. The displacement amplification self-centering friction damper according to claim 1, wherein the clamp arms are two clamp arms positioned on two sides of the friction-disc respectively, each of central parts of the two clamp arms has a second hole for the steel strand to pass through, while the two clamp arms are connected to a third bolt via the two parallel connecting rods respectively.

3. The displacement amplification self-centering friction damper according to claim 1, wherein the second disc-springs are two identical disc-springs, one of the second disc-springs is positioned between a second end cap and one of the clamp arms, and the other one of the second disc-springs is positioned between the two clamp arms;

one end of the wire bushing, near the friction device, is connected to the second end cap, the steel wire strand inside the wire bushing passes through the second end cap, then successively through the one of the second disc springs, one of the respective clamp arms, the other one of the second disc springs, the other one of the respective clamp arms, a second disc, a second anchor, and finally secured to the second disc.

4. The displacement amplification self-centering friction damper according to claim 1, wherein the connecting rods comprise an upper connecting rod and a lower connecting rod, while one end of the connecting rods is connected to the clamp arms via a rivet, and the other end of the connecting rods is connected to a third bolt;

the upper connecting rod and the lower connecting rod are respectively fixed to the outer sleeve via the third bolt;

the third bolt successively passes through the upper connecting rod, a steel bushing, the lower connecting rod, and finally fixed to the outside of the outer sleeve by a third nut.

5. The displacement amplification self-centering friction damper according to claim 4, wherein a height of the steel bushing is equal to a distance between the upper connecting rod and the lower connecting rod;

the connecting rods are provided with bends next to the third bolt in order to stagger connections between the connecting rods and the third bolt.

6. The displacement amplification self-centering friction damper according to claim 1, wherein on both sides of the outer sleeve, there are third holes at the positions corresponding to the winch gears for passing through a first bolt;

the winch gears are two in total connected in series, with the winch positioned between the two winch gears, and the outer sleeve, the winch gears, and the winch are fixed by a first bolt component;

the first bolt component comprises the first bolt and a first nut.

7. The displacement amplification self-centering friction damper according to claim 6, wherein inner sides of the first bolt component and a second bolt component have disk-shaped protrusions.

8. The displacement amplification self-centering friction damper according to claim 1, wherein an upper surface of the outer sleeve and a lower surface of the outer sleeve are both equipped with rectangular holes for the passage of the friction-disc, and fourth holes are located on the outer sleeve corresponding to the friction-disc gears for the passage of a second bolt;

the friction-disc gears are two in total, the friction-disc is between the friction-disc gears, and gaskets are set on both sides of the friction-disc;

the outer sleeve, the friction-disc gears, the friction-disc, and the gaskets are fixed by a second bolt component;

the second bolt component comprises the second bolt and a second nut.

9. The displacement amplification self-centering friction damper according to claim 1, wherein the racks and the friction-disc gears are directly meshed, or meshed by multi-stage gears to enhance displacement amplification and reduce a diameter of the friction-disc.

10. The displacement amplification self-centering friction damper according to claim 1, wherein the friction pads are fixed on inner sides of the clamp arms and next to the edge of the friction-disc, and a material of the friction pads is carbon fiber.

* * * * *